May 28, 1940.   H. M. ULLSTRAND   2,202,360
REFRIGERATION
Filed April 7, 1938   2 Sheets-Sheet 2
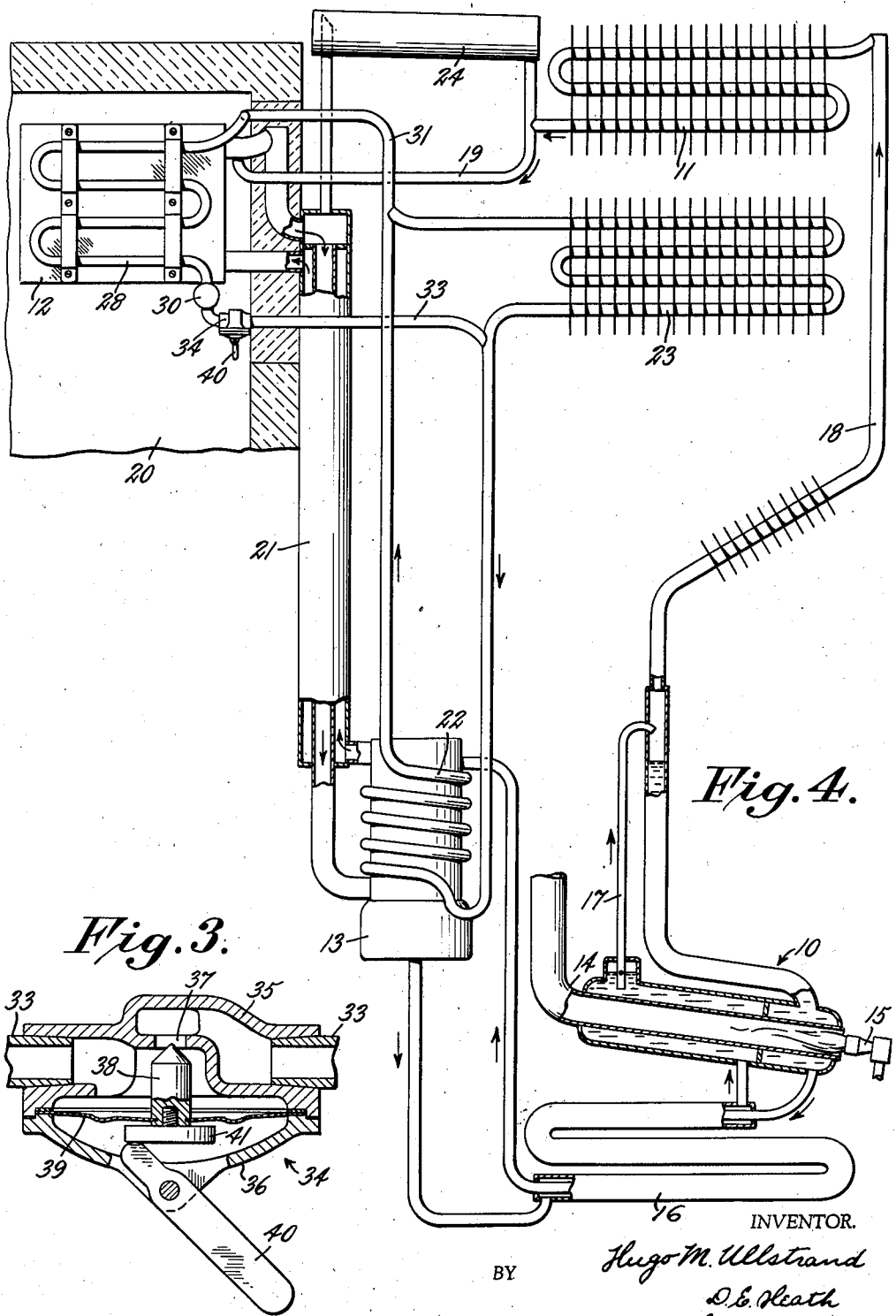

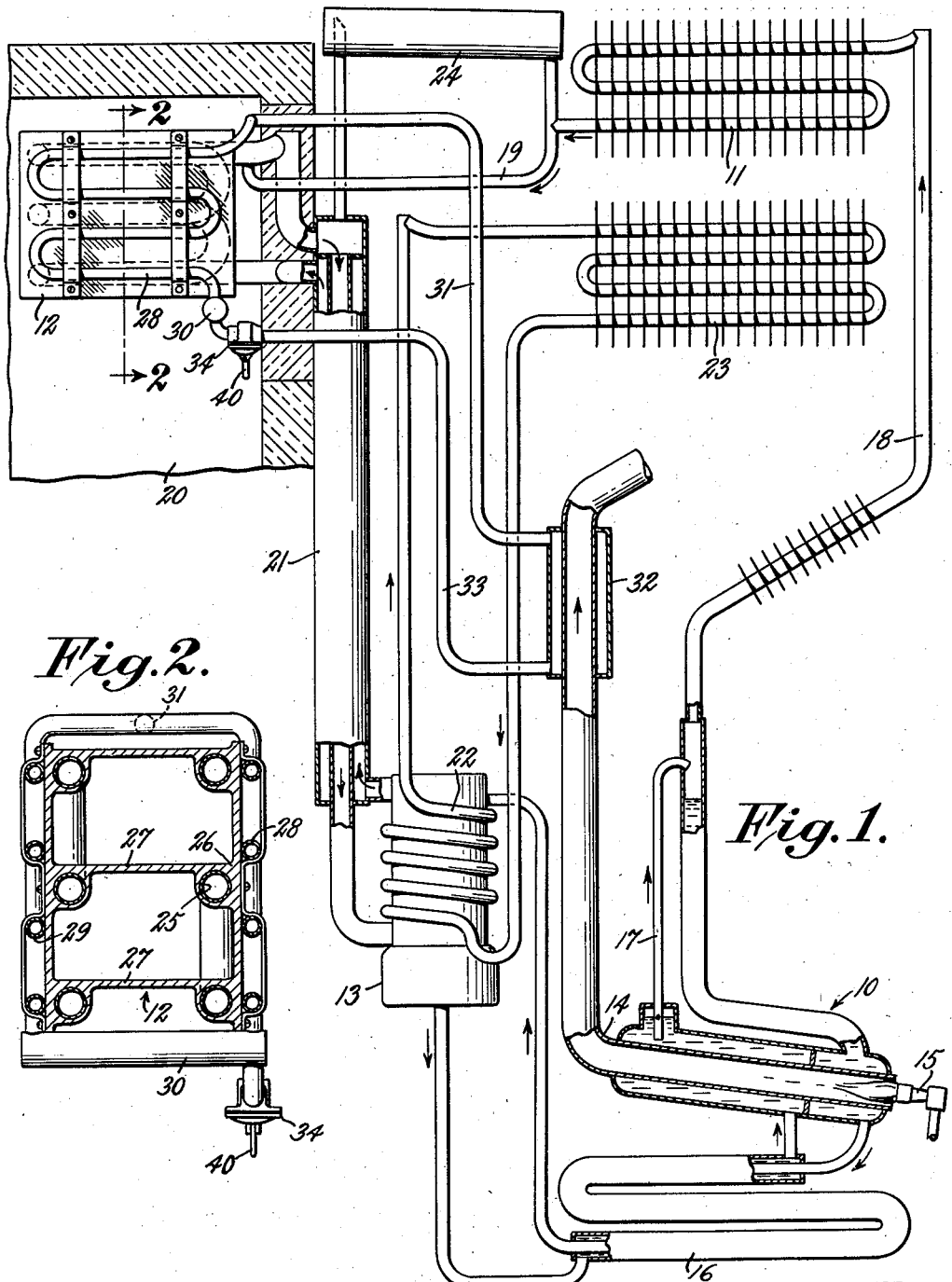

Patented May 28, 1940

2,202,360

UNITED STATES PATENT OFFICE 2,202,360

REFRIGERATION

Hugo M. Ullstrand, Evansville, Ind., assignor to Servel, Inc., New York, N. Y., a corporation of Delaware Application April 7, 1938, Serial No. 200,568

11 Claims. (Cl. 62—119.5)

My invention relates to a method and apparatus for heat transfer by fluid and more particularly to heat transfer by fluid for removal of frost from a refrigerator cooling surface.

It is an object of the invention to provide a self-stopping fluid heat transfer system. It is another object to remove frost quickly. Another object is to provide a self-stopping method and apparatus for frost removal.

I utilize vaporization and condensation of fluid to heat frost to cause it to melt and drain from a cooling surface and cause cessation of heating by stoppage of liquid flow as more fully set forth in the following description in connection with the accompanying drawings, of which:

Fig. 1 shows a heat operated refrigeration system embodying the invention;

Fig. 2 is a sectional view on line 2—2 in Fig. 1;

Fig. 3 is a detail section of a valve shown in Fig. 1; and

Fig. 4 illustrates a heat operated refrigeration system embodying a modification of the invention.

Referring to Fig. 1, the refrigeration system includes a generator 10, a condenser 11, an evaporator 12, and an absorber 13. The generator 10 is provided with a flue 14 and is heated by a burner 15 arranged so that the flame is projected into the lower end of the flue. The generator 10 and absorber 13 are interconnected by members including a liquid heat exchanger 16 for circulation of absorption liquid therethrough and therebetween. Circulation of the absorption liquid is caused by a vapor lift conduit 17. The generator 10 is connected by a conduit 18 for delivery of vapor to the condenser 11. The condenser is connected by a conduit 19 to the evaporator 12 for flow of liquid from the condenser to the evaporator. The evaporator 12 is located in the upper part of a refrigerator storage compartment 20. The evaporator 12 and absorber 13 are interconnected by members including a gas heat exchanger 21 for circulation of gas therethrough and therebetween.

The absorber 13 is cooled by a vaporization-condensation circuit including a coil 22 arranged in contact with the absorber and connected to an air cooled condenser 23.

The lower end of condenser 11 is connected to the gas heat exchanger 21 by conduits including a gas accumulation vessel 24.

The system contains refrigerant fluid, a liquid absorbent therefor, and inert gas. These fluids may be, for instance, ammonia, water, and hydrogen, respectively. Ammonia vapor is distilled from solution by heating in the generator 10. Ammonia vapor is condensed to liquid in the condenser 11. Liquid ammonia evaporates and diffuses into hydrogen in the evaporator 12 producing a refrigerating effect. Ammonia vapor is absorbed out of the gas into solution in the absorber 13. Heat input at the generator 10 and evaporator 12 is dissipated from the condensers 11 and 23. The generator heating burner 15 may be automatically controlled by a thermostatic device (not shown) responsive to temperature of the evaporator 12.

The evaporator 12, as better shown in Fig. 2, comprises a pipe coil 25 in a cast aluminum shell 26. The evaporator is constructed to receive ice freezing trays or the like (not shown) on its shelves 27 and is arranged in the upper part of the storage compartment 20 for cooling of air in this compartment by natural draft circulation.

When the system is operated so that the evaporator 12 is at temperatures below the freezing point of water, as is necessary to produce ice freezing, frost forms on the surfaces of the evaporator due to condensation of water vapor from air flowing in contact with these surfaces, and freezing of the condensate.

It is desirable to remove this frost at intervals both on account of its thermal insulating property and also for sanitary reasons. To provide for removal of the frost, I provide pipe coils 28 and 29 which are flat and strapped against each side of the evaporator casing 26. The lower ends of coils 28 and 29 are connected to a receiver 30 located beneath the evaporator. The upper ends of the coils 28 and 29 are connected together and both connected by a conduit 31 to the upper part of a jacket 32 located around the generator flue 14. The lower part of the jacket 32 is connected by a conduit 33 to the receiver 30. In the conduit 33 is a valve 34. The jacket 32 is located at a point lower than the evaporator so that liquid will flow from receiver 30 through conduit 33 into the jacket 32. The circuit formed by the parallel coils 28, 29 and the jacket 32 is filled with a suitable heat transfer fluid and comprises a vaporization-condensation circuit of which the jacket 32 is the place of vaporization and the coils 28, 29 are the place of condensation. The quantity of fluid placed in this circuit should be sufficient that when it is substantially all in liquid phase it will be held by the receiver 30 and coils 28, 29.

The valve 34 is a normally closed valve. It is shown in detail section in Fig. 3. The valve 34 comprises a casing 35 and a cap 36. The casing 35 provides a fluid passage in which there is a valve opening 37. The valve opening 37 is controlled by a valve member 38. The valve member 38 is mounted on a diaphragm 39 which is secured at its periphery between ledges on the valve casing 35 and the cap 36. The ends of the fluid passage in casing 35 are constructed for connection thereto of the pipes forming conduit 33. On the cap 36 there is pivoted a lever 40 which has a short arm and a long arm respectively on opposite sides of the pivot. The valve member 38 is secured in the center of a diaphragm 39 in a manner so that it extends through the diaphragm. On the outside of the diaphragm a screw is secured to the valve member 38. This screw has a large flat head 41. The lever 40 is arranged so that the short arm is held against the screw head 41 by the weight of the longer arm. The described parts are dimensioned so that when the valve 38 is closed, the lever 40 hangs in a vertical position and locks the valve closed.

The diaphragm 39 is a metal disc which is formed so that its center is normally flexed upward, in which position the valve 38 is closed. The diaphragm 39 is a resilient over-center snap-action disc which is unstable when its center is flexed downward.

In operation, assume that valve member 38 is closed and lever 40 hangs vertically as illustrated in Fig. 1. The receiver 30 and coils 28 and 29 are flooded with liquid. The weight of the liquid is exerted downward on diaphragm 39 which, however, cannot move downward under this weight because it is locked by lever 40. It is now desired to remove the coating of frost which has formed on the surface of the refrigerator cooling element 12 and the coils 28 and 29 which are attached thereto. By pushing on the lower end of lever 40, the upper end of this lever is displaced from beneath the center of the flat headed screw 41. The weight of liquid above diaphragm 39 causes the diaphragm to snap downward. This opens valve member 38, permitting liquid to drain from receiver 30 through conduit 33 into jacket 32. As liquid drains into the jacket, the height of liquid above the diaphragm 39 decreases. When the liquid level reaches the bottom of receiver 30, the weight of liquid is not sufficient to overcome the internal stress in diaphragm 39 which then snaps upward and closes valve member 38. Thus the valve acts as a metering device which measures a predetermined quantity of liquid into the vaporizing jacket. When diaphragm 39 snaps upward, the lever 40 resumes its vertical position in which the valve member 38 is locked in its closed position.

Liquid is vaporized in jacket 32 by heat from the flue 14. The vapor flows through conduit 31 into coils 28 and 29. The vapor condenses in the coils 28 and 29 and flows downward into receiver 30. This continues until all of the liquid has been boiled out of jacket 32 and the coils 28 and 29 and receiver 30 are again flooded with liquid. The heat of condensation of vapor in coils 28 and 29 is transferred to the frost to supply heat of fusion thereto so that the frost melts and runs off the surfaces of the cooling element. The quantity of liquid in the frost melting system should be sufficient to carry out the transfer of the necessary quantity of heat to melt the quantity of frost provided for.

When jacket 32 has boiled dry, the frost melting system becomes inactive until again set into operation by manipulation of lever 40.

A frost melting system like that just described may be used to transfer heat from any suitable source. Other parts of the refrigeration system may supply the heat. Heat from the absorber, for instance, may be used. This is illustrated in Fig. 4. All the parts shown in Fig. 4 are the same as those shown in Fig. 1 and indicated by the same reference numerals. In this modification, however, the flue jacket 32 is eliminated and conduits 31 and 33 are connected respectively to the conduits connecting the upper and lower ends of the absorber cooling coil 22 and the condenser 23. This connection places the frost melting coils 28 and 29 in parallel with the absorber cooling condenser 23. In this arrangement, the same fluid is used in the absorber cooling circuit and the frost melting circuit. The quantity of fluid in the system is the sum of that required for the absorber cooling and frost melting parts. When valve 34 is operated, as previously described, liquid from receiver 30 and coils 28 and 29 is dumped into the absorber cooling circuit. To accommodate this extra quantity of liquid, a receiver, not shown, could be connected to the absorber cooling circuit if found necessary.

When liquid has been dumped from coils 28 and 29 and receiver 30 by manipulation of valve 34, vapor from the absorber cooling coil 22 also enters coils 28 and 29. This continues, causing melting of frost as previously described, until the coils 28 and 29 are again filled with liquid.

Various changes and modifications may be made within the scope of the invention which is set forth in the following claims.

What is claimed is:

1. The combination with a refrigeration system having a cooling element subject to formation of frost thereon, of a vaporization-condensation circuit forming a heater for melting the frost, a device for stopping and starting circulation of fluid in said circuit, means for operating said device to start circulation and stop circulation responsive to change in quantity of fluid in liquid phase in a part of said circuit.

2. In a refrigerator having cooling surfaces subject to formation of frost thereon, a heater for melting the frost including a vaporization-condensation heat transfer circuit, means for admitting liquid to the vaporization portion of said circuit, and means for terminating operation of said first means responsive to decrease in quantity of liquid in a part of said circuit caused by operation of said first means.

3. A method of melting frost from cooling surfaces of a refrigerator which includes transferring heat to the frost with the aid of a vaporization-condensation circuit, and terminating heat transfer by filling the condensation portion of said circuit with liquid.

4. A method of melting frost on cooling surfaces of a refrigerator which includes transferring heat to the frost with the aid of a vaporization-condensation circuit and admitting liquid only in predetermined quantities to the vaporization portion of said circuit.

5. The combination with a refrigerator having cooling surfaces subject to formation of frost thereon, of a vaporization-condensation circuit for transferring heat to the frost to cause melting thereof, and a device for metering flow of fluid in said circuit.

6. A method of melting frost on the cooling surfaces of a refrigerator which includes measuring a quantity of liquid by weighing, vaporizing said quantity of liquid, and condensing the vapor in heating relation to the frost.

7. In a refrigerator having cooling surfaces subject to formation of frost, a vaporization-condensation circuit for melting the frost, means for flooding the condensation portion of said circuit with liquid to prevent heat transfer thereto and discharging liquid therefrom to permit heat transfer thereto.

8. The combination with a refrigeration system having cooling surfaces subject to formation of frost thereon and a vaporization-condensation heat transfer circuit cooling another part of the system, of a condenser connected to said vaporization-condensation circuit and arranged to heat the frost to cause melting thereof, and means for flooding said condenser with liquid to exclude vapor from said circuit and discharge liquid therefrom to permit entrance of vapor from said circuit when defrosting is desired.

9. An absorption refrigeration system including a cooling element subject to formation of frost thereon, an absorber, a vaporization-condensation circuit for cooling said absorber and having a plurality of places of condensation one of which is arranged to heat the frost to cause melting thereof, and means for controlling flow of heat transfer fluid in said one of the places of condensation.

10. In a refrigerator having cooling surfaces subject to formation of frost thereon, a heater for melting the frost including a vaporization-condensation heat transfer circuit, and a self closing valve in said circuit in the path of flow of liquid between the condensation portion and the vaporization portion of the circuit.

11. A refrigerator as set forth in claim 10 in which there is a reservoir for liquid in said path of flow between the condensation portion and said valve.

HUGO M. ULLSTRAND.